United States Patent [19]
Furst et al.

[11] Patent Number: 6,137,517
[45] Date of Patent: Oct. 24, 2000

[54] IMAGE REGISTRATION ADJUSTMENT SYSTEM AND METHOD FOR DYNAMICALLY COMPENSATING FOR PHOTORECEPTOR BELT SKEW

[75] Inventors: Michael Robert Furst, Rochester; Daniel W. Costanza, Webster, both of N.Y.; Mark A. Omelchenko, Lexington, Ky.; David Kerxhali, Rochester; Richard C. Schenk, Webster, both of N.Y.

[73] Assignee: Xerox Corporation, Stamford, Conn.

[21] Appl. No.: 09/291,072

[22] Filed: Apr. 14, 1999

[51] Int. Cl.⁷ .......................... G03G 15/00; G03G 15/01
[52] U.S. Cl. ........................................... 347/116; 399/165
[58] Field of Search ................................. 347/116, 234; 399/165; 198/810.03; 226/3; 700/57, 58, 59; 340/675, 676

[56] References Cited

U.S. PATENT DOCUMENTS

| 5,510,877 | 4/1996 | DeJong et al. ............................. 399/38 |
| 5,717,984 | 2/1998 | Wong ....................................... 399/165 |
| 5,737,003 | 4/1998 | Moe et al. ............................... 347/116 |
| 5,903,805 | 5/1999 | Ueda et al. ............................. 399/165 |

FOREIGN PATENT DOCUMENTS 62-237469  10/1987  Japan.

*Primary Examiner*—Joan Pendegrass
*Attorney, Agent, or Firm*—Oliff & Berridge, PLC

[57] ABSTRACT

A method and apparatus for determining and correcting registration skew in an image is presented. In the method and apparatus according to this invention, problems in registration, such as misalignment of images and incorrect registration with a receiving substrate are reduced or eliminated. According to this invention, an addition of a second sensor at the transfer end of the photoreceptor belt and the inclusion of a dynamic skew controller will help solve this problem for the lateral direction registration errors. To this end, this invention provides an image processing device embodied as the dynamic skew controller with an additional belt sensor mounted at the transfer end of the photoreceptor module and a microcontroller to measure and calculate the required adjustments. Based on the calculations, the lateral position of images and substrates are adjusted, thus eliminating lateral dynamic registration errors.

33 Claims, 11 Drawing Sheets

IMAGE REGISTRATION ADJUSTMENT SYSTEM AND METHOD FOR DYNAMICALLY COMPENSATING FOR PHOTORECEPTOR BELT SKEW

BACKGROUND OF THE INVENTION

1. Field of Invention

This invention generally relates to detecting and maintaining good lateral image and paper registration in color image processing. More particularly, this invention relates to methods and systems in which image and paper registration adjustments are based on observing the movement of a photoreceptor belt.

2. Description of Related Art

Electrophotography, a method of copying or printing documents, is performed by exposing a light image representation of a desired document onto a substantially uniformly charged photoreceptor, such as a belt. In response to that light image, the photoreceptor discharges to create an electrostatic latent image of the desired document on the photoreceptor's surface. Developing material, or toner, is then deposited onto that latent image to form a developed image. That developed image is then transferred to a final substrate, such as paper. The surface of the photoreceptor is then cleaned of residual developing material and recharged in preparation for the production of another image.

Color images may be produced by repeating the above process once for each different colored toner that is used to make a composite color image. For example, in one color imaging process, referred to herein as the Recharge, Expose, and Develop, Image On Image (REaD IOI) process, a charged photoreceptor surface is exposed to a light image which represents a first color. The resulting electrostatic latent image is then developed with a first colored toner. The charge, expose and develop process is repeated for a second colored toner, then for a third colored toner, and finally for a fourth colored toner. The various differently colored toners are placed in superimposed registration on the first developed image so that a desired composite color image results. That composite color image is then transferred and fused onto an image recording substrate or medium.

SUMMARY OF THE INVENTION

This invention provides color imaging methods and systems where each color image is to be registered in a composite manner.

This invention provides systems and methods that improve the registration of the colored images.

This invention separately provides systems and methods that dynamically control the input of the image data to remove or reduce an image registration error known as skew.

This invention separately provides a dynamic skew controller for an image forming device that controls the output of the image data to reduce or eliminate skew.

This invention separately provides sensors to the image forming device that are capable of providing real time skew information for controlling the output of the image data to remove or reduce the effects of skew.

In accordance with the systems and methods of this invention, problems in registration, such as misalignment of images and incorrect registration with a receiving substrate, are reduced or eliminated.

In one aspect of the systems and methods of the invention, output of image data is controlled based on a measured receiving substrate skew and a determined image skew. In another aspect of the systems and methods of this invention, the image processing device outputs an image based on a measured receiving substrate skew and a determined image skew.

FIG. 1 shows an example of the skew effect recognized and adjusted by the systems and methods according to this invention. As the photoreceptor belt 350 skews during a print run, a registration error is generated between subsequent color image separation layers as the color image separation layers are imaged on the imaging substrate such as a photoreceptor belt, an intermediate transport belt or an intermediate image bearing belt. The magnitude of the error in the color image separation layer imaged onto the imaging or intermediate substrate by a fourth station 340, e.g., a CYAN station, which is the farthest from a first station 310, which is nearest to a steering end of the photoreceptor module, e.g., a BLACK station, is the largest. The error decreases generally linearly as the distance to the imagers from the steering end decreases. This linear behavior is characteristic of the photoreceptor belt 350 slowly moving laterally at a transfer end T of the belt 350 relative to the steering end S of the belt 350. Because of the steering system, the photoreceptor belt 350 at the steering end S of the photoreceptor module remains at a fixed lateral position. In contrast, the transfer end T of the photoreceptor belt 350 shifts laterally relative to the steering end S.

Skew in a developed image is undesirable because, if the developed image is transferred to a final substrate without adjusting for the skew, the final transferred image will include a skew-induced registration error. That is, each differently-colored color image separation layer will be slightly skewed, or offset, relative both to the other color image separation layers making up the final full color image and to the receiving substrate. This misregistration, even if only a few mils, or tens of microns, is well within the visual acuity of the human eye. Since the human eye can sense this misregistration, the quality of the resulting image suffers greatly even for small misregistration errors.

The methods and systems of this invention improve the registration of the color image separation layers relative to each other and of the final aggregated image relative to the receiving substrate. According to the systems and methods of this invention, registration errors that occur due to the skew occurring at the transfer end of the photoreceptor belt can be reduced or eliminated by the dynamic skew controller.

This invention provides an image processing device that includes a pair of photoreceptor belt sensors mounted at the transfer and steering ends of the photoreceptor module and the dynamic skew controller includes a microcontroller or the like to determine the required adjustments. The initial photoreceptor belt edge profile is measured when the image forming device is first set-up. Then, the dynamic skew controller monitors the skew during the print run based on the measured edge profile. As the photoreceptor or intermediate belt skew changes due to changing forces on the belt, the dynamic skew controller determines and applies the necessary adjustments to control the output of the image data to keep the differently-colored color image separation layers and the receiving medium in register throughout the print run.

These and other features and advantages of the systems and methods of this invention are described in or are apparent from the following detailed description of the preferred embodiments.

BRIEF DESCRIPTION OF THE DRAWINGS

The invention will be described in relation to the following drawings, in which reference numerals refer to like elements, and wherein.

DETAILED DESCRIPTION OF PREFERRED EMBODIMENTS

Figure 1:
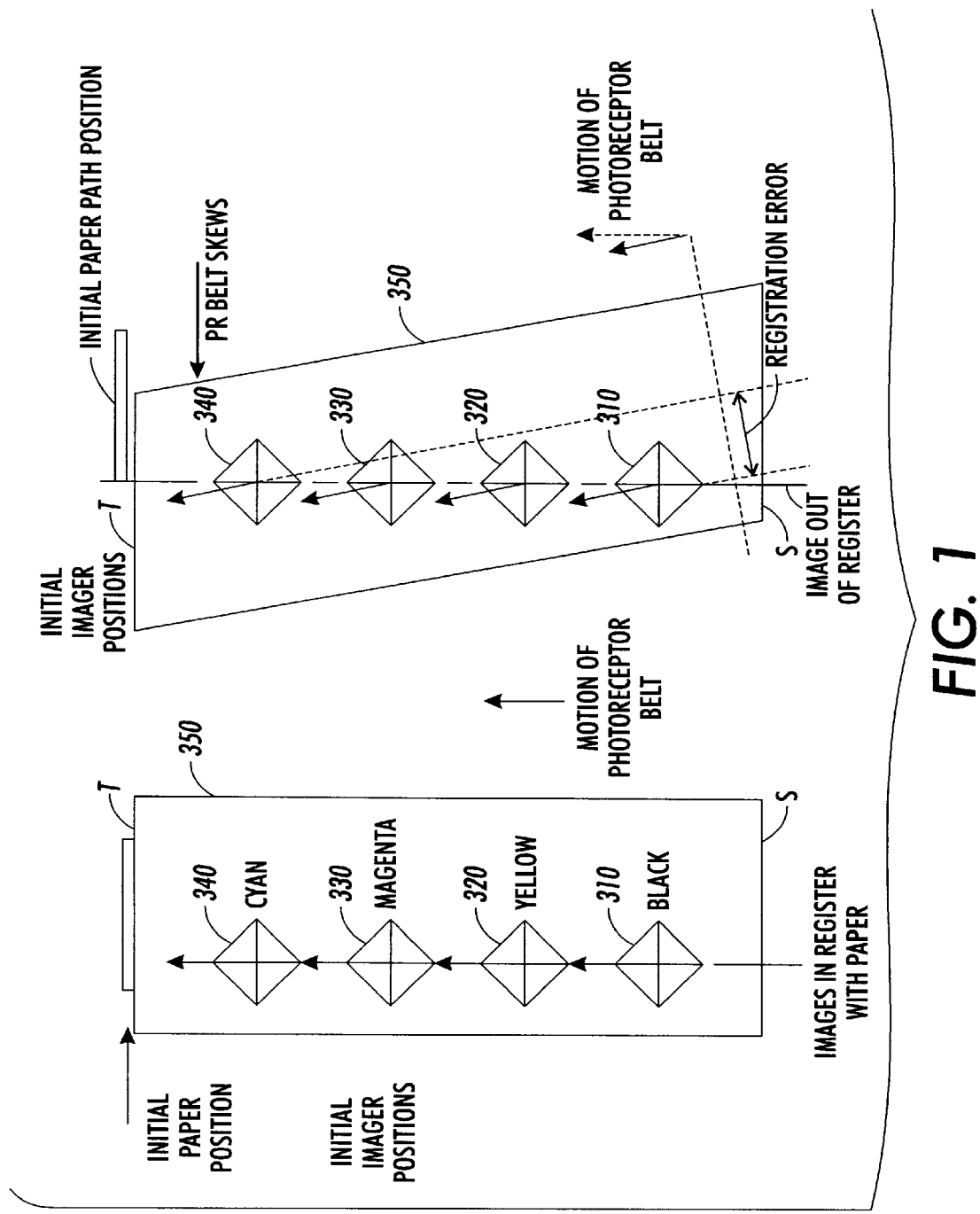
FIG. 1 shows an example of skew in a full color image forming system.
Figure 2:
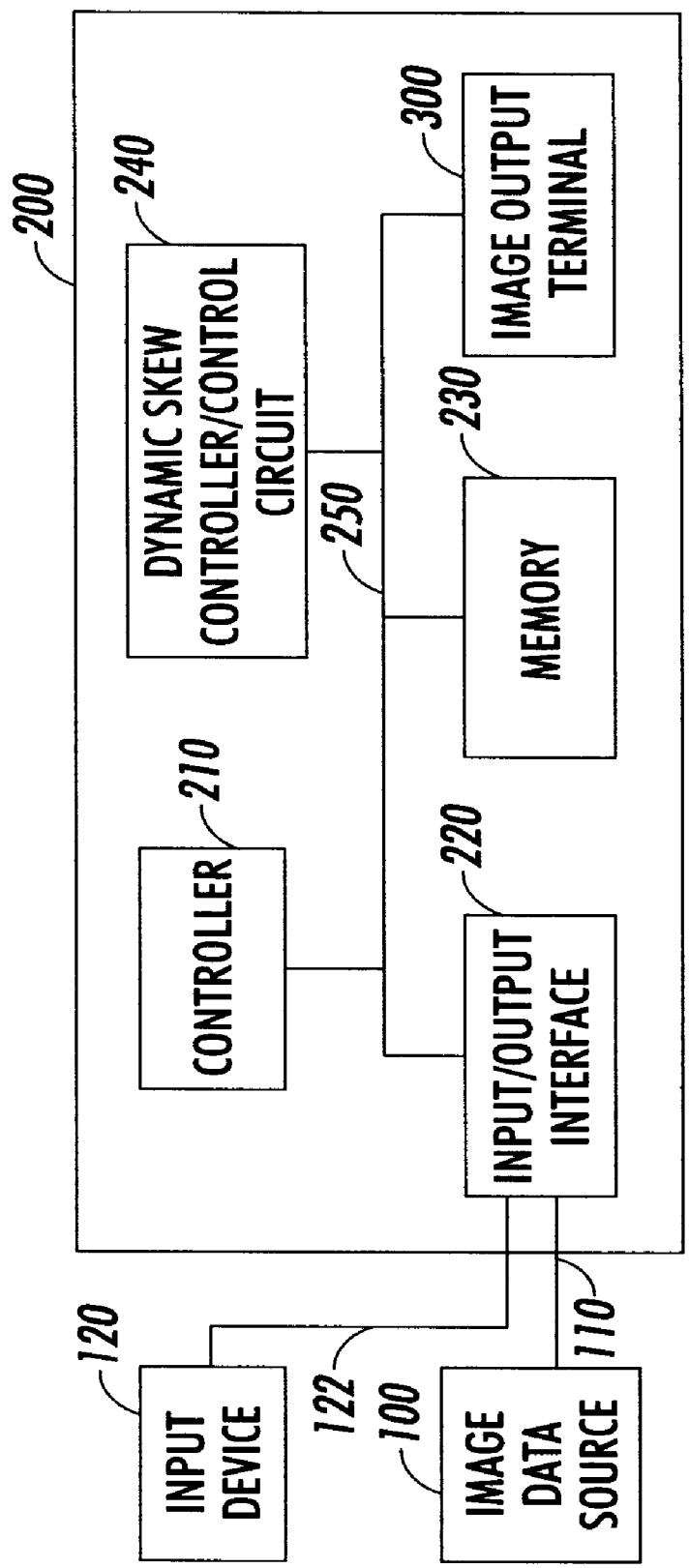
FIG. 2 shows one exemplary embodiment of an image processing apparatus that incorporates dynamic skew control in accordance with this invention.

FIG. 2 shows one exemplary embodiment of an image processing apparatus 200 incorporating dynamic skew control in accordance with this invention. As shown in FIG. 2, an image data source 100 and an input device 120 are connected to the image processing apparatus 200 over links 110 and 122, respectively. The image data source 100 can be a digital camera, a scanner, or a locally or remotely located computer, or any other known or later developed device that is capable of generating electronic image data. Similarly, the image data source 100 can be any suitable device that stores and/or transmits electronic image data, such as a client or a server of a network. The image data source 100 can be integrated with the image processing apparatus 200, as in a digital copier having an integrated scanner, or the image data source 100 can be connected to the image processing apparatus 200 over a connection device, such as a modem, a local area network, a wide area network, an intranet, the Internet, any other distributed processing network, or any other known or later developed connection device. For example, the image data source can be the Raster Image Processor (RIP) of a digital copier.

It should also be appreciated that, while the electronic image data can be generated at the time of printing an image from electronic image data, the electronic image data could have been generated at any time in the past. Moreover, the electronic image data need not have been generated from an original physical document, but could have been created from scratch electronically. The image data source 100 is thus any known or later developed device which is capable of supplying electronic image data over the link 110 to the image processing apparatus 200. The link 110 can thus be any known or later developed system or device for transmitting the electronic image data from the image data source 100 to the image processing apparatus 200.

The input device 120 can be any known or later developed device for providing control information from a user to the image processing apparatus 200. Thus, the input device 120 can be a control panel of the image processing apparatus 200, or could be a control program executing on a locally or remotely located general purpose computer, or the like. As with the link 110 described above, the link 122 can be any known or later developed device for transmitting control signals and data input using the input device 120 from the input device 120 to the image processing apparatus 200.

As shown in FIG. 2, the image processing apparatus 200 includes a controller 210, an input/output interface 220, a memory 230, a dynamic skew control circuit 240 and an image output terminal 300, each of which is interconnected by a control and/or data bus 250. The links 110 and 122 from the image data source 100 and the input device 120, respectively, are connected to the input/output interface 220. The electronic image data from the image data source 100, and any control and/or data signals from the input device 120, are input through the input interface 220, and, under control of the controller 210, are stored in the memory 230 and/or provided to the controller 210.

The memory 230 preferably has at least an alterable portion and may include a fixed portion. The alterable portion of the memory 230 can be implemented using static or dynamic RAM, a floppy disk and disk drive, a hard disk and disk drive, flash memory, or any other known or later developed alterable volatile or non-volatile memory device. If the memory includes a fixed portion, the fixed portion can be implemented using a ROM, a PROM, an EPROM, and EEPROM, a CD-ROM and disk drive, a DVD-ROM and disk drive, a writable optical disk and disk drive, or any other known or later developed fixed memory device.

The dynamic skew control circuit 240 adjusts the control information for the electronic image data stored in the memory 230 for each different color image separation layer of the electronic image data based on the current value for the skew of the photoreceptor belt in the image output terminal 300. The dynamic skew control circuit 240 then outputs the adjusted control signals for controlling the output of the electronic image data by the image output terminal 300.

It should be appreciated that the steering of the photoreceptor belt 350 can also be controlled based on the current value for the skew of the photoreceptor belt 350. This steering control system is described on U.S. patent application Ser. No. 09/240,880, incorporated herein by reference in its entirety. Furthermore, it should also be appreciated that the lateral position of the photoreceptor belt 350 can be controlled using a passive system instead of the active steering control system described in the incorporated '880 application. This passive system is described in U.S. Pat. No. 5,383,006 to Castelli, incorporated herein by reference in its entirety.

The dynamic skew control circuit 240 can also adjust the control information used to control the position of the receiving substrate to place it into proper registration with the color images based on the current value for the skew of the photoreceptor belt in the image output terminal 300. The dynamic skew control circuit 240 then outputs the adjusted control signals for controlling the position of the receiving substrate from the memory 230 to the image output terminal 300 over the control and/or data bus 250.

While FIG. 2 shows the dynamic skew control circuit 240 and the image output terminal 300 as portions of an integrated system, the dynamic skew control circuit 240 could be provided as a separate device from the image output terminal 300. That is, the dynamic skew control circuit 240 may be a separate device attachable upstream of a stand alone image output terminal 300. For example, the dynamic skew control circuit 240 and the sensors 352 and 354 may be devices which interface with both the image data source 100 and the image output terminal 300. For example, the dynamic skew control circuit 240 may be incorporated into a network print server that forms a portion of the image data source 100 and that receives the sensor signals from the sensors 352 and 354 and controls the input of the image data to the image output terminal 300.

Furthermore, the dynamic skew control circuit 240 may be implemented as software on the image processing apparatus 200 or the image data source 100. Other configurations of the elements shown in FIGS. 2 and 3 may be used without departing from the spirit and scope of this invention.

Figure 3:
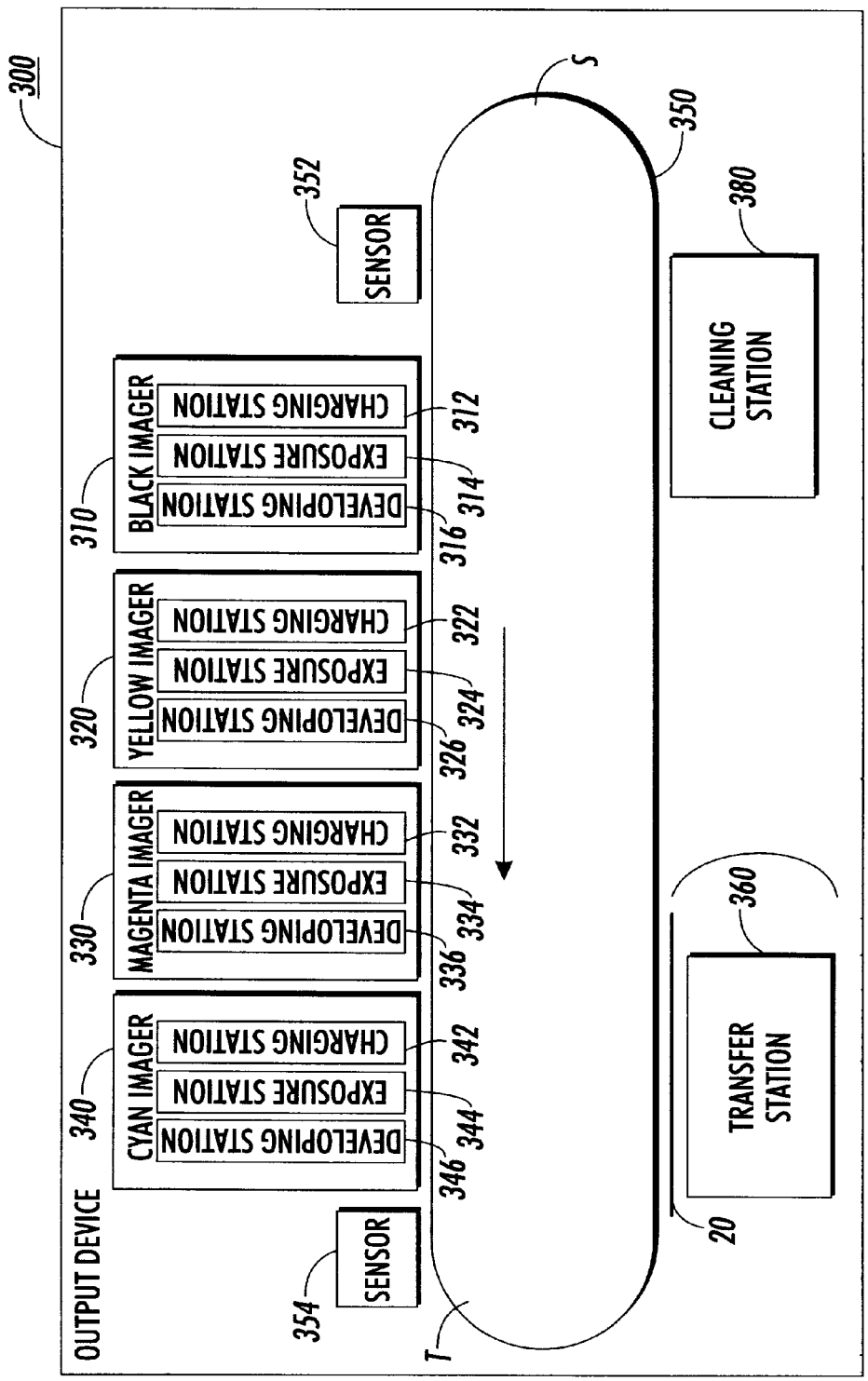
FIG. 3 shows one exemplary embodiment of a color photocopier or printer that incorporates the dynamic skew control of this invention.

FIG. 3 shows one exemplary embodiment of the image output terminal 300 according to this invention. As shown in FIG. 3, the image output terminal 300 includes a plurality of color imagers 310–340, a photoreceptor belt 350, a transfer station 360, and a cleaning station 380. Each of the color imagers 310–340 are located along the length of the photoreceptor belt 350 from a steering end S of the photoreceptor belt 350 to a transfer end T of the photoreceptor belt 350, respectively. In particular, each of the color imagers 310–340 includes a charging station 312, 322, 332, and 342, respectively, an exposure station 314, 324, 334, and 344, respectively, and a developing station 316, 326, 336, and 346, respectively.

It should be appreciated that the color imagers 310–340 may be located on different spans of the photoreceptor belt 350. For example, one or more of the imagers 310–340 may be located on a span of the photoreceptor belt 350 that extends from the transfer end T to the steering end S of the photoreceptor belt 350. In this case, any such imager will be located on the opposite side of the image output terminal 300 than the other imagers.

It should also be appreciated that while FIG. 3 shows a photoreceptor as the imaging substrate affected by skew, the image output terminal 300 may use other imaging substrates. For example, the dynamic skew control can be applied with equal effectiveness to a non-photoreceptor intermediate belt system which builds color image separation layers on a separate photoreceptor and transfers the images to an intermediate belt before transferring the images from the intermediate belt to a final substrate. This intermediate belt system is described on U.S. Pat. No. 5,406,359 to Fletcher, incorporated herein by reference in its entirety. Alternatively, the dynamic skew control can be applied to a transport belt system which forms the images on a separate photoreceptor and transfers the color image separation layers to a final substrate carried by a transport belt. This transfer belt system is described on U.S. Pat. No. 4,916,547 to Katsumata et al., incorporated herein by reference in its entirety. In these systems the imaging stations can be considered to also include the photoreceptor on which the images are formed and from which the images are transferred.

It should be appreciated that, according to the systems and methods of this invention, each image forming station is controlled to form the image based on the lateral position of the belt, so that, when the image is formed on, or transferred to, the belt, that image will be registered with the other images carried or to be carried on the belt.

In each of the imagers 310–340, the respective charging station 312–342 uniformly charges the photoreceptor belt 350 in preparation for forming a latent electrostatic image. In each of the imagers 310–340, the respective exposure station 314–344 exposes the uniformly charged photoreceptor belt 350 to form the latent electrostatic image on the photoreceptor belt 350. Then, in each of the imagers 310–340, the respective developing station 316–346 applies toner of a different color to develop the latent electrostatic image formed on the photoreceptor belt 350 using a differently colored toner.

It should be appreciated that each of the exposure stations 314–344 may be implemented using any known or later developed device for forming an electrostatic latent image on the photoreceptor belt 350. For example, the exposure stations 314–344 could be a rotating polygon raster output scanner (ROS), a full width printbar containing light emitting diodes, laser diodes, organic light emitting diodes or the like.

Because each of the imagers 310–340 is located at a different position along the photoreceptor belt 350, if the lateral position of the belt changes as a particular portion of the belt travels from the steering end S to the transfer end T and back to the steering end, an image formed by a downstream imager will not be exactly aligned with an image formed by an upstream imager, due to the lateral movement of the photoreceptor belt 350. If the positions of the imagers are constant relative to the steering and transfer ends S and T, their positions relative to one or both of the steering and transfer ends S and T can be measured and appropriate adjustments can be made to the control signals for each of the imagers 310–340. Furthermore, for each portion of the photoreceptor belt 350, if the lateral position of that portion of the photoreceptor belt 350 changes from a constant setup position as that portion of the photoreceptor belt 350 travels from the steering end S to the transfer end T, the unadjusted color image separation layers formed by each of the imagers 310–340 will not be exactly aligned to each other, or due to the further lateral movement of the photoreceptor belt 350 between the fourth imager 340 and the transfer station 360, to the receiving substrate 20 at the transfer station 360.

Accordingly, the image output terminal 300 further includes a steering end sensor 352 and a transfer end sensor 354. Each of the steering and transfer end sensors 352 and 354 senses the instantaneous lateral position of the photoreceptor belt 350 at the steering and transfer ends, respectively. The steering and transfer end sensors 352 and 354 output signals indicative of the instantaneous lateral position of the photoreceptor belt 350 over the control and/or data bus 250 to the dynamic skew control circuit 240.

The dynamic skew control circuit 240 inputs the signals from the sensors 352 and 354 and determines the difference in lateral position of the photoreceptor belt between the steering and transfer ends of the photoreceptor belt 350 based on the sensor signals and the previously measured and recorded edge profile of the photoreceptor belt 350. The difference in the lateral position of the photoreceptor belt 350 at the steering and transfer ends S and T indicated by the sensor signals must be adjusted based on the characteristics of the photoreceptor belt 350. The difference in lateral positions is adjusted by removing a predetermined variation in the edge profile for the currently-sensed portions of the photoreceptor belt 350 from the positions measured by the sensors 352 and 354. This adjusted difference generally represents the skew in the photoreceptor belt 350.

The dynamic skew control circuit 240 then determines the amounts of lateral displacement from the belt position determined by the steering end sensor 352 at the belt positions to the various positions where the exposure stations 314–344 are writing the electrostatic latent images on the photoreceptor belt 350.

Based on the lateral offsets at the writing positions of each of the exposure stations 314–344 determined by the dynamic skew control circuit 240, the dynamic skew control circuit 240 modifies the control signals for outputting the image data by at least three of the imagers 310–340 so that the electrostatic latent images written by each of the exposure stations 314–344 will be substantially aligned. Accordingly, when the electrostatic latent images developed at each of the developing stations 316–346 are developed, the resulting color image separation layers formed by each of the imagers 310–340 will be substantially aligned with each other, thus minimizing the misregistration between the various color image separation layers formed by the imagers 310–340.

Furthermore, the dynamic skew control circuit 240 can also correct for skew between the imager 340 and the location of the receiving substrate at the transfer station 360. If the dynamic skew control circuit 240 also corrects for skew between the imager 340 and the transfer station 360, either the position of the receiving substrate or output of the image data by the imagers 310–340 is controlled. In particular, the position of the receiving substrate is controlled based on the lateral offsets determined by the dynamic skew control circuit 240 between the imager 340 and the transfer station 360. Alternatively, output of the image data for the imagers 310–340 is further controlled based on the skew between the imager 340 and the transfer station 360.

In either case, the resulting color image separation layers formed by each of the imagers 310–340 will be substantially aligned with each other. Accordingly, when the resulting color image separation layers are transferred onto the receiving substrate 20 at the transfer station 360, the resulting color image separation layers formed by each of the imagers 310–340 will be substantially aligned with the desired position on the receiving substrate 20. This minimizes, for example, any misregistration between the various color image separation layers formed by the imagers 310–340 and any other images or any specified image-to-substrate tolerances on the receiving substrate 20.

Figure 4:
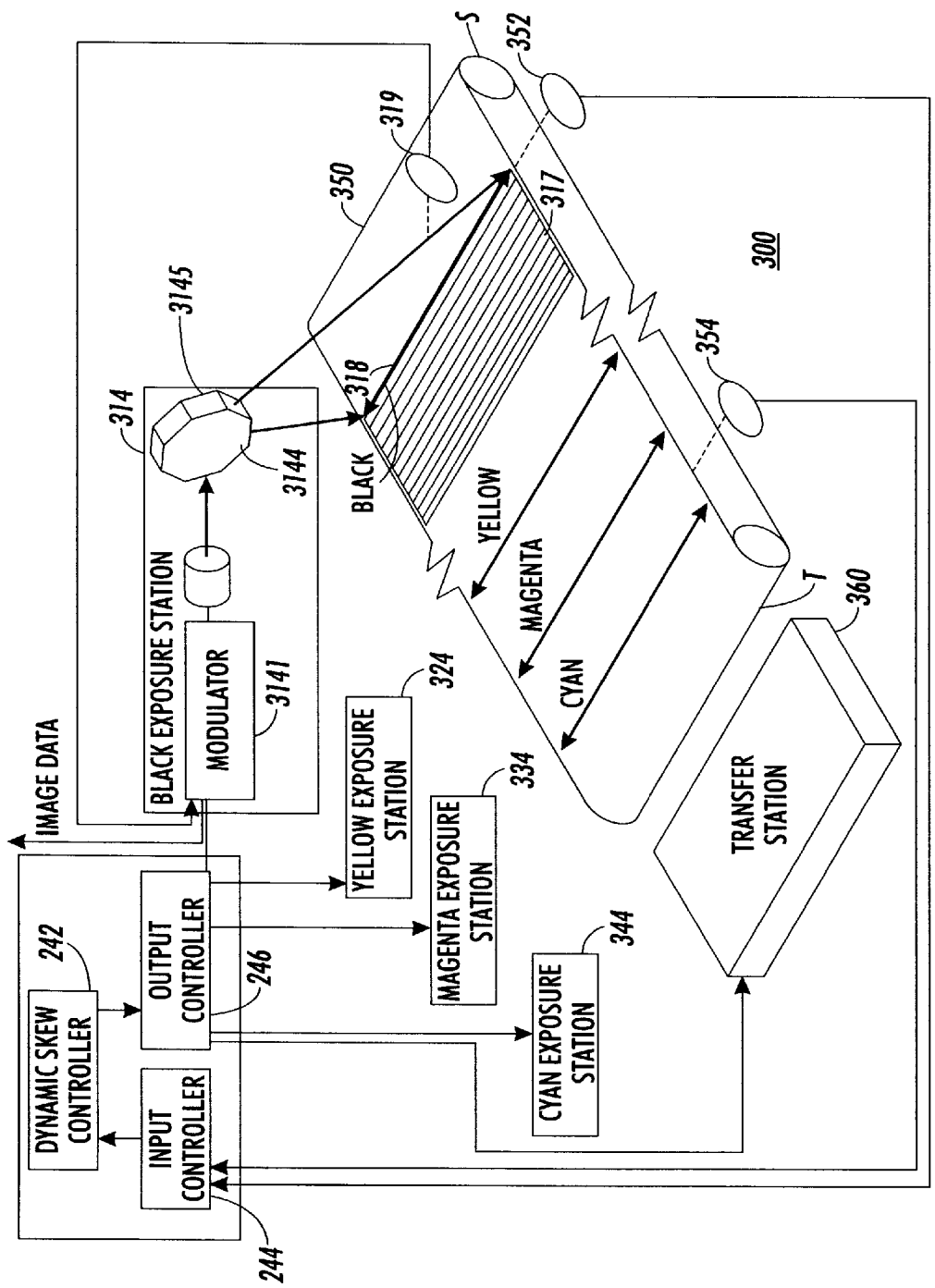
FIG. 4 shows one exemplary embodiment of the photoreceptor belt provided with dynamic skew control shown in FIGS. 2 and 3 in greater detail.

FIG. 4 shows one embodiment of the image output terminal 300 and the dynamic skew control circuit 240 shown in FIGS. 2 and 3 in greater detail. As shown in FIG. 4, in this exemplary embodiment of the image output terminal 300, each of the imagers 310–340 are implemented using a raster output scanner to expose the photoreceptor belt 350. As shown in FIG. 4, each of the exposure stations 314–344 includes a modulator 3141 that modulates one or more light beams based on the input image data and a light emitting device 3142 connected to the modulator 3141 that emits the at least one light beam 3143 modulated by the modulator 3141. Each light beam 3143 emitted by the light emitting device 3142 is imaged onto a facet 3145 of a rotating polygon 3144 by a set of input optics (not shown). Each light beam reflected from the current facet 3145 of the rotating polygon 3144 is imaged onto the photoreceptor 350 using a set of output optics (not shown).

It should be appreciated that the image output terminal 300 can also be employed with imagers of other styles as well. These include, but are not limited to, devices such as linear arrays of exposure devices or LED bars.

As shown in FIG. 4, a particular color image separation layer 317 formed on the photoreceptor 350 comprises a plurality of scanlines 318. Each scanline 318 has a beginning point and an ending point. The beginning point, or "start of scan" point, is the point at which the current facet 3145 of the rotating polygon mirror 3144 directs each of the one or more light beams 3143 onto an appropriate portion of the photoreceptor belt 350 such that image data can be recorded. Each start-of-scan sensor 319 independently determines the "start of scan" reference point for the corresponding exposure station and independently provides suitable feedback signals to the corresponding exposure station. Feedback signals from the start-of-scan sensors 319 to the imager 310–340 provide reference points indicating the position of the one or more light beams 3143 on the photoreceptor 350. These feedback signals are input to the modulator 3141 of the corresponding exposure station of the imagers 310–340.

The dynamic skew controller 240, based on the current value for the skew of the photoreceptor belt 350, generates, for each imager 310–340, an imager specific control signal used by the corresponding modulator 3141 to determine, in response to receiving the start-of-scan signal from the corresponding start-of-scan sensor 319, when to begin modulating the one or more light beams 3143 based on the image data for the current scan line. That is, based on the timing control signals from the dynamic skew controller 240 and the feedback signals from the start-of-scan sensor 319, the modulator 3141 begins modulating the light beam 3143 based on the image data for the current scan line at a point in time which eliminates the effects of skew. The modulated light beam 3143 is then emitted by the light emitting device 3142 and is imaged onto a facet 3145 of a rotating polygon 3144.

Figure 5:
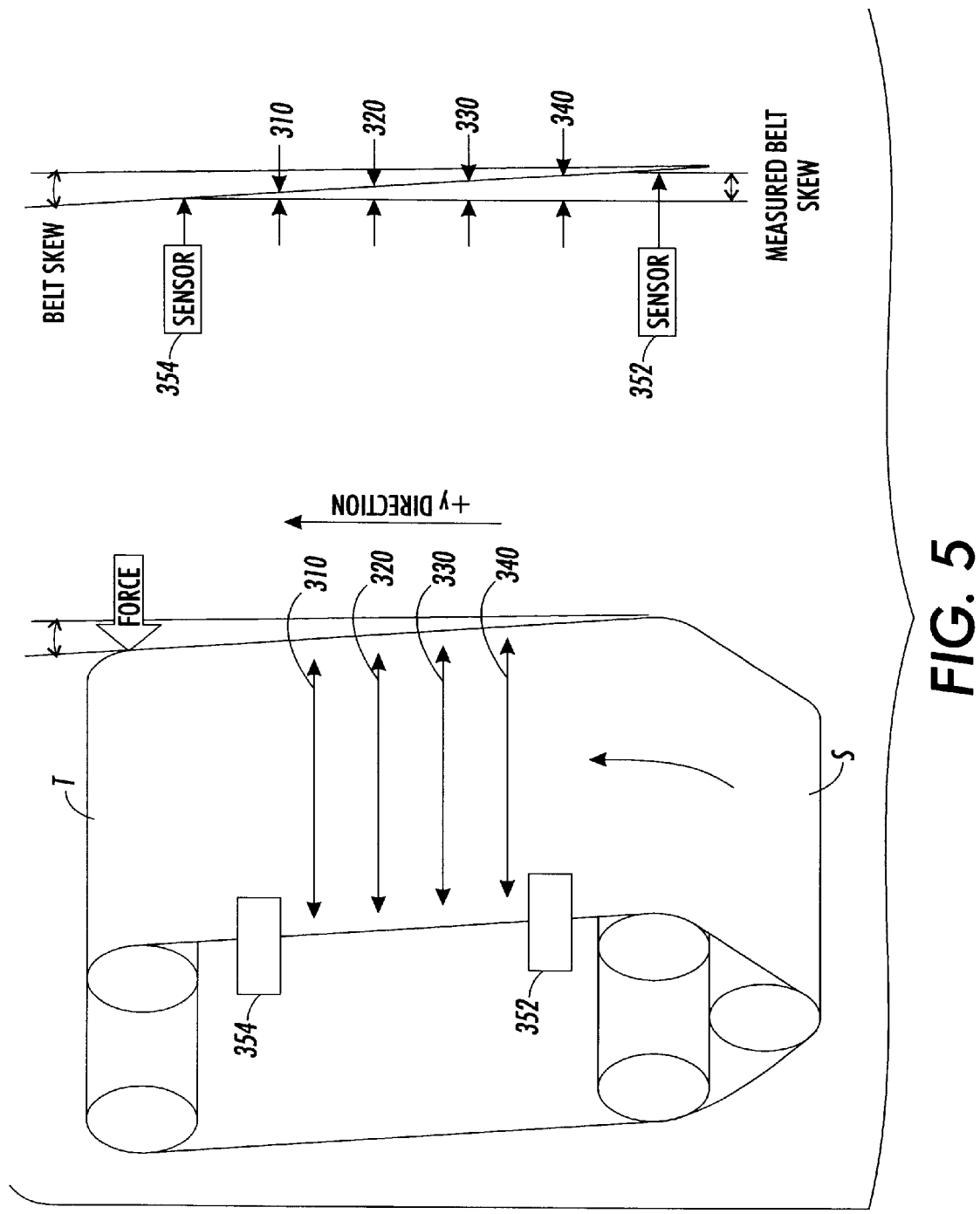
FIG. 5 shows an example illustrating the linear relationship between the skew and position along the photoreceptor belt.

The control of the output of the image data by the modulator 3141, and possibly the position of the substrate, by the dynamic skew control circuit 240 is based on the observation that the photoreceptor belt 350 laterally moves in a linear fashion between any two points, such as between the sensors 352 and 354. FIG. 5 shows an exemplary linear relationship between the skew and the various imagers 310–340. As shown in FIG. 5, by measuring the lateral position of the edge of the photoreceptor belt 350 at the sensors 352 and 354, the lateral position of the photoreceptor belt 350 anywhere between the sensors 352 and 354 can be approximated. The lateral position at any point of interest is determined by multiplying the total photoconductor belt skew, which is the difference in lateral position at the at the sensors 352 and 354, by the ratio of the distance from that point of interest to the sensor 352 to the distance between the sensors 352 and 354. If the point of interest is the position along the photoreceptor 350 at which a particular imager 310–340 is forming the corresponding scanline 318, the amount of skew at that position can thus be determined.

It should be appreciated that the reference point for corrections could be at the sensor 354, but due to sampling delays and dynamic behavior of the skew, the sensor 352 is the preferred reference point.

Figure 6:
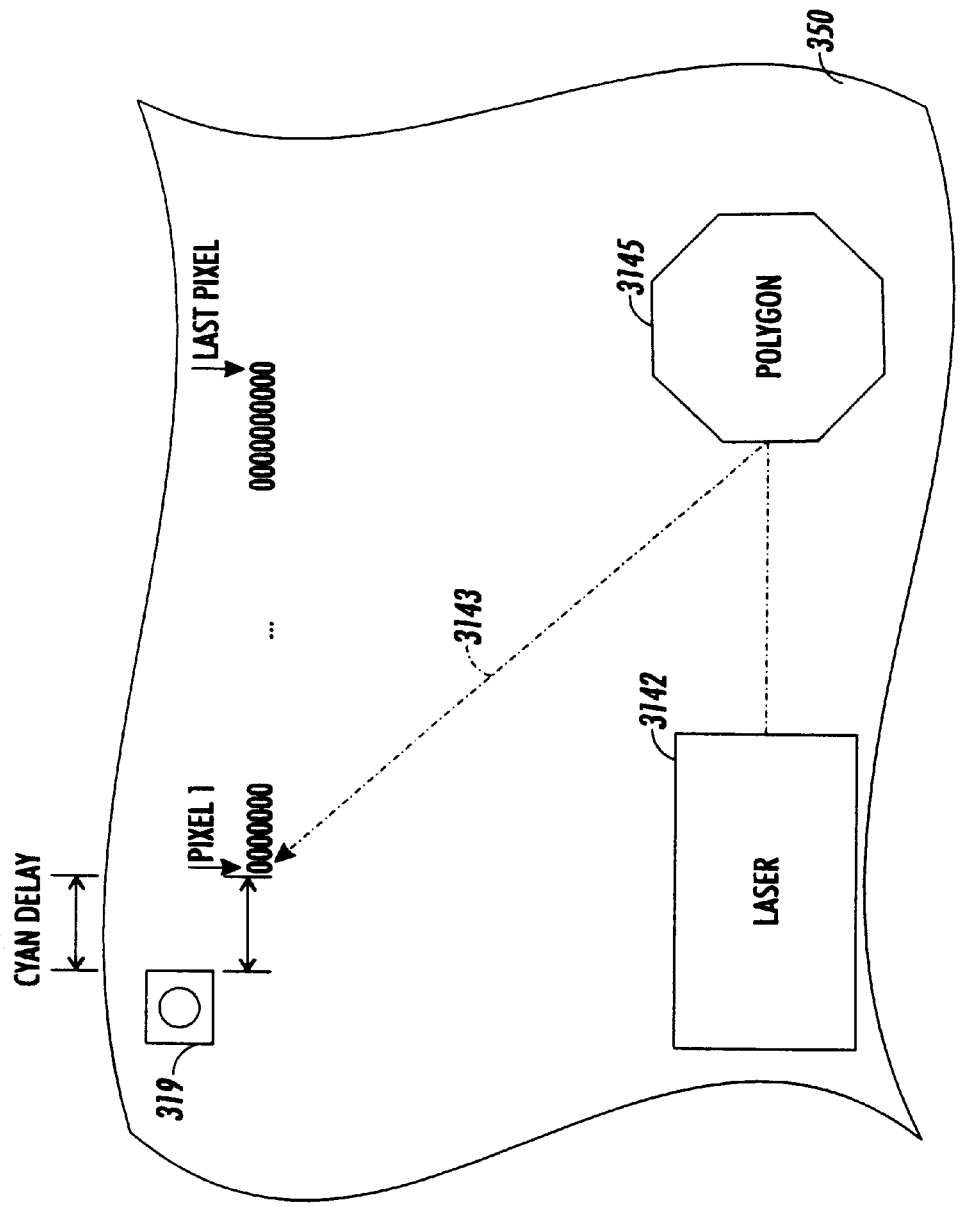
FIG. 6 illustrates how adjusting the delay modifies the position of a scan line on the imaging substrate.
Figure 7:
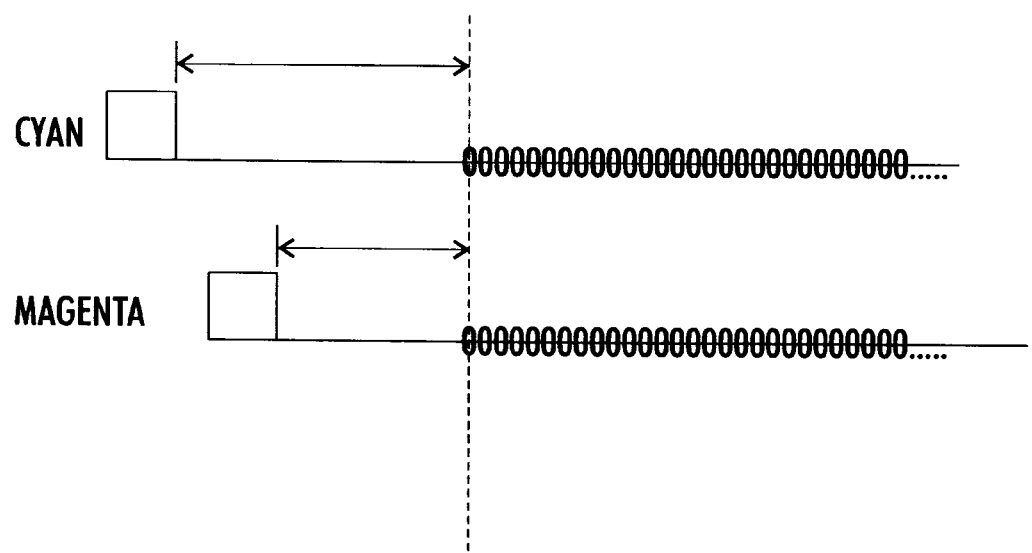
FIG. 7 illustrates the differing amount of physical offset relative to the receiving substrate that can occur between two imaging stations and how adjusting the delay due to this offset aligns the corresponding separation layers.

The dynamic skew control circuit 240 adds a dynamic delay to the modulators 3141 to a predetermined lateral start-of-scan delay already applied by the modulators. This predetermined lateral start-of-scan delay is used to remove any offset errors caused by a physical imager misalignment of the imagers 310–340 from each other. As shown in FIGS. 6 and 7, for each imager 310–340, this physical imager misalignment between the color image separation layers can be removed by adding an imager-specific time delay between 1) sensing the laser beam being at the start-of-scan position, as sensed by the corresponding start-of-scan sensor; and 2) beginning the modulation of the corresponding light beam based on the image data.

FIG. 7 illustrates the differing amount of physical offset relative to the photoreceptor belt 350 that can occur between two imagers. As shown in FIG. 7, different imager-specific delays for the physical imager misalignment are introduced for each of the two images to produce registered images. By introducing an imager-specific delay, the different color image separation layers are then aligned accordingly to be correctly registered with one another, assuming there is no skew.

By knowing the amount of skew, the imager-specific start-of-scan delay and the position of the one or more light beams 3143 along the photoreceptor belt 350, the dynamic skew control circuit 240 can suitably control the output of the image data by the imagers 310–340 to compensate for the amount of dynamic skew added to the static physical imager misalignment. That is, the image data is recorded on the photoreceptor belt 350. In particular, the electrostatic latent image is formed by modulating each light beam 3143 emitted by the light emitting device 3142 based on the electronic image data received from the memory 230 via the control and/or data bus 250, the feedback signals from the start-of-scan sensor 319 and the timing control signals from the dynamic skew control circuit 240. Thus, by controlling, based on the amount of skew and the imager-specific start-of scan delay, when the modulators 3141 output the modulation signals to the light emitting devices 3142 to form the current scanlines 318 relative to the start-of-scan signals output from the start-of-scan sensors 319, the relative lateral location of each scanline 318 on the photoreceptor belt 350 can be very precisely controlled.

As shown in FIG. 4, the dynamic skew control circuit 240 includes a dynamic skew controller 242, an input controller 244, and an output controller 246. The output controller 246 controls the timing of the output of the image data by the exposure stations 314–344 and the timing of the transfer station 360. The input controller 244 receives the signals output from the steering and transfer end sensors 352 and 354.

It should be appreciated that while FIG. 4 shows the modulators 3141 as part of the exposure stations 314–344, the modulator 3141 for each of the exposure stations 314–344 could be incorporated into the output controller 246 as a portion of an integrated system. That is, the output controller 246 may directly output the modulator signals to the light emitting device 3142 to modulate the light beams 3143 by combining the timing and modulation functions. In this case, the signal lines from the start-of-scan sensors 319 of the imagers 310–340 will be connected directly to the output controller 246.

After the steering and transfer end sensors 352 and 354 sense the instantaneous lateral position of the photoreceptor belt 350 at the steering and transfer ends S and T, respectively, the sensed results are input to the input controller 244. The dynamic skew controller 242 then modifies the timing control signals for the modulators 3141 and for the timing control of the transfer station 360. The output controller 246 then controllably outputs the timing control signals to the exposure stations 314–344, and the transfer station 360, accordingly.

In a first exemplary embodiment, to remove skew, the dynamic skew controller 242 controls the output of the image data by the modulators 3141 and the position of the receiving substrate using, for example, a nominal edge position table. The nominal edge position table serves to link the set-up measurements that correct for any static misalignment error and the dynamic skew adjustment measurements. The nominal edge position table is used because the photoreceptor belt edge, which is used as a surrogate for direct registration measurement, is not straight and large errors in measurement will otherwise be generated. Measured belt position values are compared to nominal values in the nominal edge position table stored for the current sample position along the photoreceptor belt 350 to determine the instantaneous belt skew based on the difference between the nominal belt edge positions and the sensed current belt edge positions.

The nominal edge position table is obtained when the image processing apparatus 200 is first, or subsequently, set up. During set-up, the dynamic skew controller 242 collects data on the nominal position of the edge of the photoreceptor belt 350 at each of the sensors 352 and 354 for a number of sample positions along the photoreceptor belt 350. The dynamic skew controller 242 reduces one or more belt revolutions of this belt position data to an average or suitably filtered edge profile and stores the filtered edge profile as the nominal edge position table. The nominal edge position table has one entry for each sample position along the photoreceptor belt 350. The dynamic skew nominal controller 242 then uses this nominal edge position table when determining the skew adjustments to be made during a print run.

Figure 8:
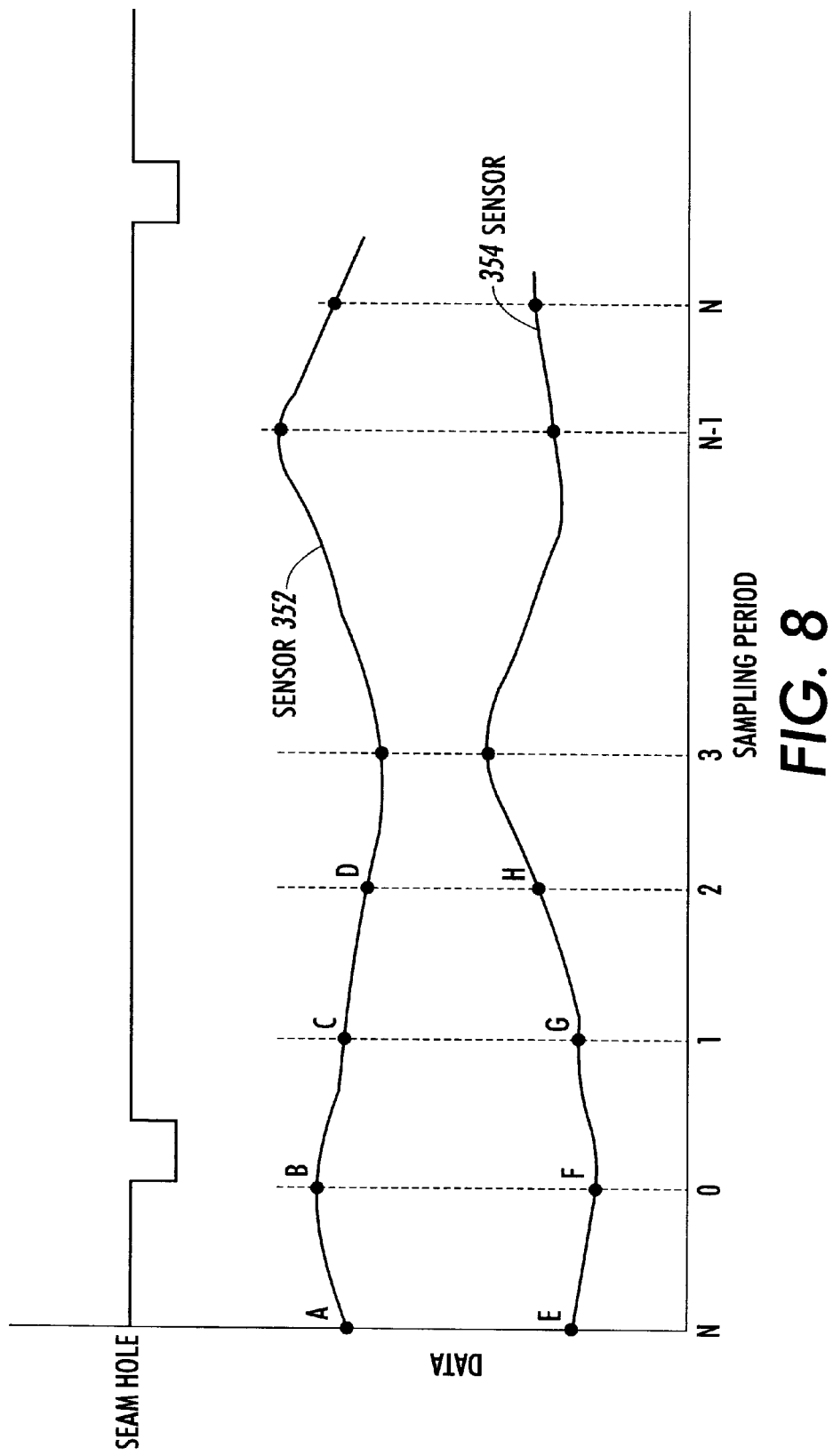
FIG. 8 illustrates the edge profile of the photoreceptor belt sensed by the belt edge sensors.

FIG. 8 illustrates examples of generating and using the nominal edge profile of the photoreceptor belt 350. As shown in FIG. 8, nominal edge profile data A-H are taken at the sensors 352 and 354 for each sampling positions 1 to N. The profile data A-H are then saved in the nominal edge position table for dynamic skew control.

In this first exemplary embodiment, during the print run, the dynamic skew controller 242 subtracts, for each sample position, the value in the nominal edge position table for each sensor from the value of the corresponding sensor signal to determine the actual lateral position of the photoreceptor belt 350 at each of the sensors 352 and 354. The dynamic skew controller then determines the instantaneous belt skew K as the difference between the actual belt position at each of the sensors 352 and 354. Thus, the instantaneous belt skew value is:

$$K = (M_1 - N_1) - (M_2 - N_2) \qquad (1)$$

where:

K is the instantaneous belt skew;

$M_1$ is the measured position value of the belt at the first sensor;

$N_1$ is the nominal position value of the current belt position at the first sensor;

$M_2$ is the measured position value of the belt at the second sensor; and $N_2$ is the nominal position value of the current belt position at the second sensor.

Alternatively, in a second embodiment, the dynamic skew controller 242 modifies the image data and the receiving substrate registration using a nominal skew table. The nominal skew table stores skew measurements rather than edge profile data. During set-up, the dynamic skew controller 242 obtains the belt edge positions at each of the sensors 352 and 354 for each of a number of positions along the photoreceptor belt 350. The dynamic skew nominal controller 242 then determines the difference between belt edge positions at the sensors 352 and 354 at each of the positions along the photoreceptor belt 350, and stores the determined difference, i.e., the nominal skew between the measured belt edge positions when there is no actual skew, as the nominal skew table. The nominal skew table has one entry for each sample position along the photoreceptor belt 350. The dynamic skew nominal controller 242 then uses this nominal skew table when determining the skew adjustments to the timing control signals to be made during a print run.

In this second exemplary embodiment, during the print run, the dynamic skew controller 242 measures the belt edge position at each of the sensors 352 and 354, for a particular sample position, and determines the difference between the measured belt edge positions to determine a measured skew value. The dynamic skew controller 242 then subtracts the nominal skew value in the nominal skew table for that sample position from the measured skew value to determine the actual skew of the photoreceptor belt 350 between the sensors 352 and 354. Thus, in this second exemplary embodiment, the actual skew value K is:

$$K = (N_1 - N_2) - (M_1 - M_2) \qquad (2)$$

where:

K is the instantaneous belt skew;

$N_1$ is the nominal position value of the current belt position at the first sensor;

$N_2$ is the nominal position value of the current belt position at the second sensor;

$M_1$ is the measured position value of the belt at the first sensor; and $M_2$ is the measured position value of the belt at the second sensor.

The nominal edge position or skew table, depending on whether the first or second exemplary embodiment is used, and the sampled data are synchronized to the photoreceptor belt 350. Based on the resulting actual skew measurement, the adjustments to be made to the timing control signals based on the positions of the images 310–340 and lateral paper position are determined. The dynamic skew controller 242 continues to determine the instantaneous skew throughout the print run to keep the images and the receiving paper laterally registered.

In particular, for each imager, the total timing signal adjustment value A is:

$$A_i = P_i + K_T * G_i \qquad (3)$$

where:

i indicates the particular imager;

$A_i$ is the total timing signal adjustment value for the ith imager;

$P_i$ is the physical imager misregistration value for the ith imager determined at setup;

$K_T$ is the actual skew for a given sample time; and $G_i$ is the gain for the ith images, i.e., the ratio of the distance between the first or second sensor 352 or 354 and the imager to the distance between the first and second sensors 352 and 354.

It should be appreciated that this procedure also works for imagers on two different belt spans. As discussed above, all of the imagers 310–340 are not limited to being located on one span, or one side, of the photoreceptor belt 350, i.e., the side of the photoreceptor belt 350 extending from the steering end S to the transfer end T. One or more of the imagers 310–340 may be located on the other side of the photoreceptor 350, i.e., from the transfer end T to the steering end S.

It should also be appreciated that the timing signals can be modified in various ways. In a second exemplary embodiment of the systems and methods that dynamically adjust the timing signals to remove or reduce skew of this invention, the timing signals for the imager 310 are not modified based on the dynamic skew, while the timing signals for the imagers 320–340 are modified based on the dynamic skew to place the images formed by the imagers 320–340 into registration with the image formed by the imager 310 based on the unmodified timing signals used to control the placement of the scanline 318 formed by the imager 310.

It should also be appreciated that the actual controlled adjustment could be filtered or modified in any manner known to provide better performance.

In contrast, in a third exemplary embodiment of the systems and methods that dynamically adjust the timing signals to remove or reduce skew of this invention, the timing signals for the imager 340 are not modified, while the timing signals for the imagers 310–330 are modified to place the images formed by the imagers 310–330 into registration with the image formed by the image 340.

Alternatively, in a fourth exemplary embodiment of the systems and methods that dynamically adjust the timing signals to remove or reduce skew of this invention, the timing signals for all the imagers 310–340 are modified to place the images formed by the imagers 310–340 into registration with a reference position on the photoreceptor belt 350.

Moreover, in a fifth exemplary embodiment of the systems and methods that dynamically adjust the timing signals to remove or reduce skew of this invention, when the timing signals for all the imagers 310–340 are modified to place the images formed by the imagers 310–340 into registration with the substrate, as outlined above, the reference position may be determined from the additional skew from the last imager 340 and the transfer station 360 to place the images from the imagers 310–340 into registration with the substrate.

It should also be appreciated that, rather than further altering the timing signals to place the images into registration with the substrate, the position of the substrate relative to the photoreceptor belt at the transfer position can be modified based on the additional skew from the last imager 340 and the transfer station 360.

Figure 9:
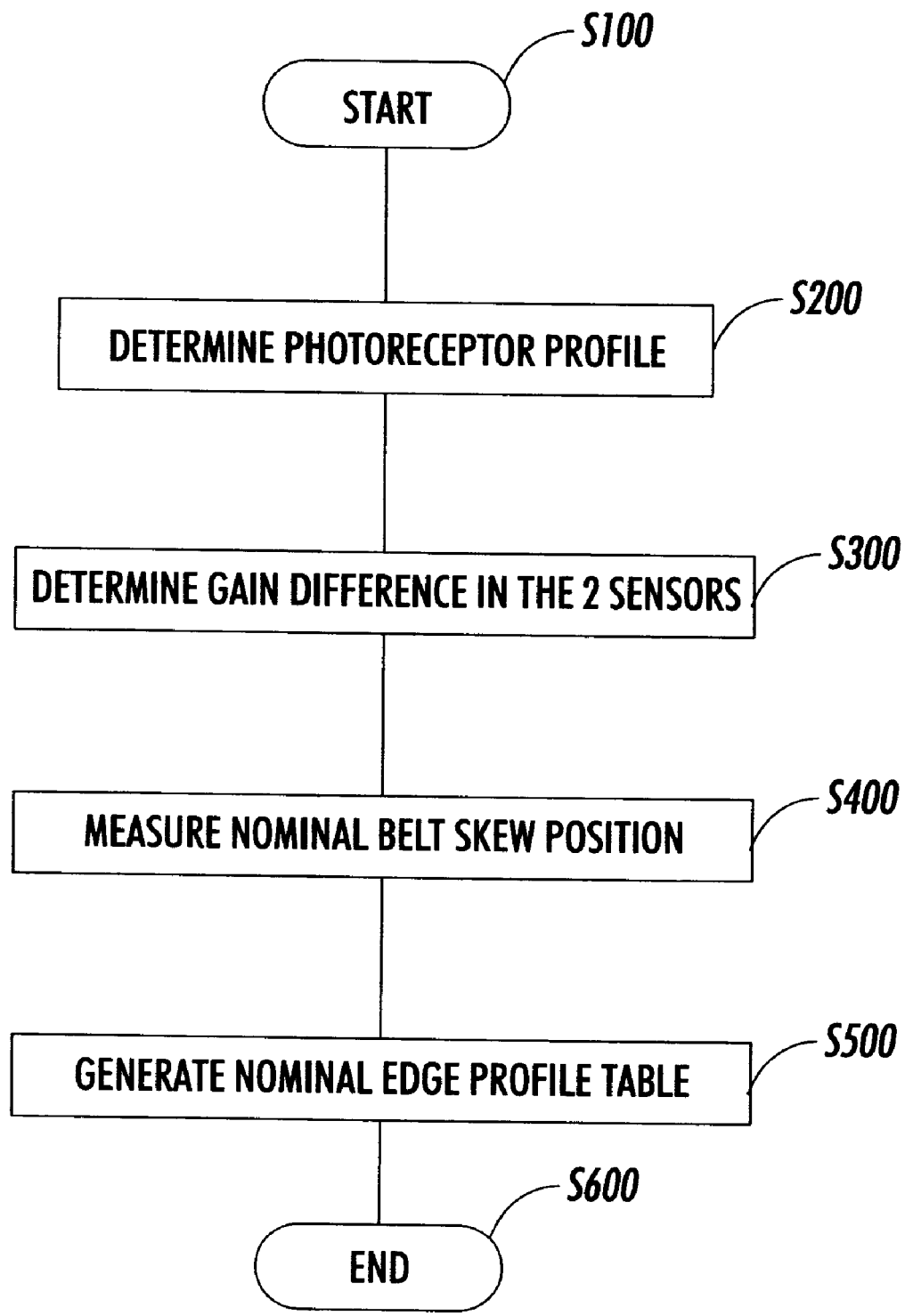
FIG. 9 is a flowchart outlining one exemplary embodiment of the set-up method according to this invention.

FIG. 9 is a flowchart outlining one exemplary embodiment of the set-up method of this invention. Starting in step S100, control continues to step S200, where the photoreceptor belt edge profile for each position along the belt for each sensor is determined through a process of data collection from each belt edge sensor. Then, in step S300, the relative gain difference in the two sensors is determined to obviate any differences in the signals representing the edge profiles due to the gain differences in the sensors. That is, for the same position along the belt, with no skew, the outputs of the sensors should be the same. Any differences in the sensor output signals is thus due to a gain difference between the sensors. By determining the gain difference, the sensor outputs can be compensated for the gain difference to sense the lateral belt position identically at both of the sensors. Control then continues to step S400.

In step S400, the position of the photoreceptor belt at each of the sensors and relative to the position of transfer station during the registration set-up procedure is measured as the nominal belt position. Alternatively, for each position along the photoreceptor belt 350, the difference between the positions sensed by the sensors during the registration set-up procedure may be calculated as the nominal skew. Next, in step S500, the nominal edge profile table or the nominal skew table is generated. The nominal edge profile or skew table serves to link the set-up measurements and the dynamic skew adjustment measurements. Then in step S600, the control routine ends.

Figure 10:
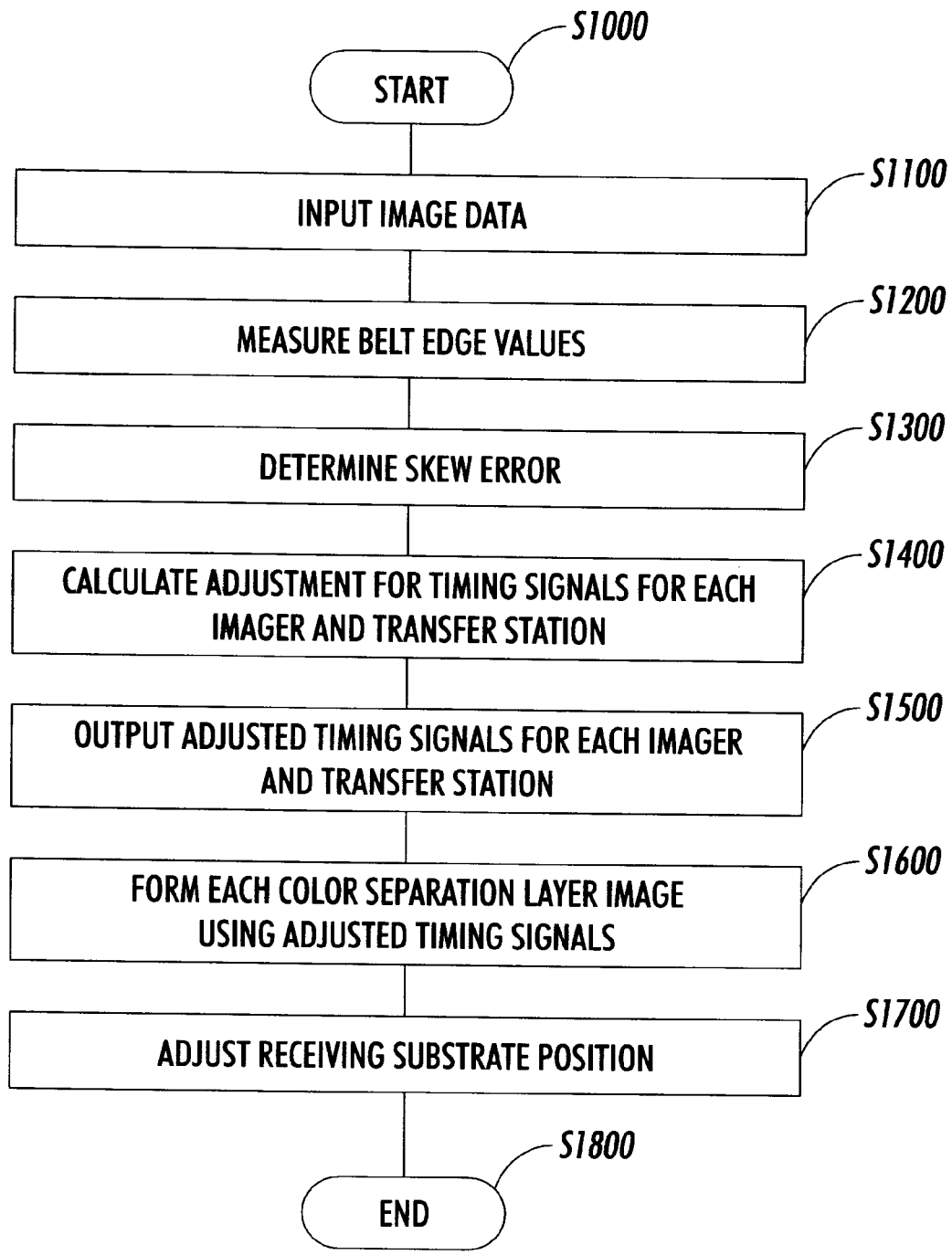
FIG. 10 is a flowchart outlining one exemplary embodiment of a method for dynamically adjusting for skew according to this invention.

FIG. 10 is a flowchart outlining one exemplary embodiment of a method for dynamically adjusting for skew according to this invention. Beginning at step S1000, control continues to step S1100, where the electronic image data is input. Next, in step S1200, the instantaneous belt edge values of the photoreceptor belt are measured. Then, in step S1300, the measured belt position values are compared to each other and to the values in the nominal edge profile or skew table to determine the instantaneous belt skew K. In particular, the instantaneous belt skew K is the difference between the nominal belt edge positions or values from the nominal skew table and the sensed current belt edge positions. The current belt edge position measurements for each sensor obtained during image processing are adjusted based on the corresponding nominal belt edge positions for the current position along the belt using either the nominal edge position table or the nominal skew table according to Equation 1 or Equation 2, respectively, to remove the belt edge signature. Control then continues to step S1400.

In step S1400, based on the determined skew between the sensors, the image specific dynamic skew adjustments to the timing signals for the imagers and for the transfer station are determined to ensure the images remain laterally registered with each other and with the receiving substrate. That is, the dynamic skew timing signals for each imager are adjusted and dynamic skew timing signals for the transfer station are adjusted, so that any displayed or printed image will appear without skew. Then, in step S1500, the dynamic-skew-adjusted timing signals for each imager are combined with the corresponding imager-specific start-of-scan delay and output to the appropriate imager. Next, in step S1600, each color image separation layer is formed by the appropriate imager using the adjusted timing signals, received start-of-scan signals and image data. Control then continues to step S1700.

In step S1700, the timing signals for the transfer station are adjusted to modify the receiving substrate's position to maintain proper registration between the images and the receiving substrate at the transfer station. Control then continues to step S1800, where the control routine ends.

Figure 11:
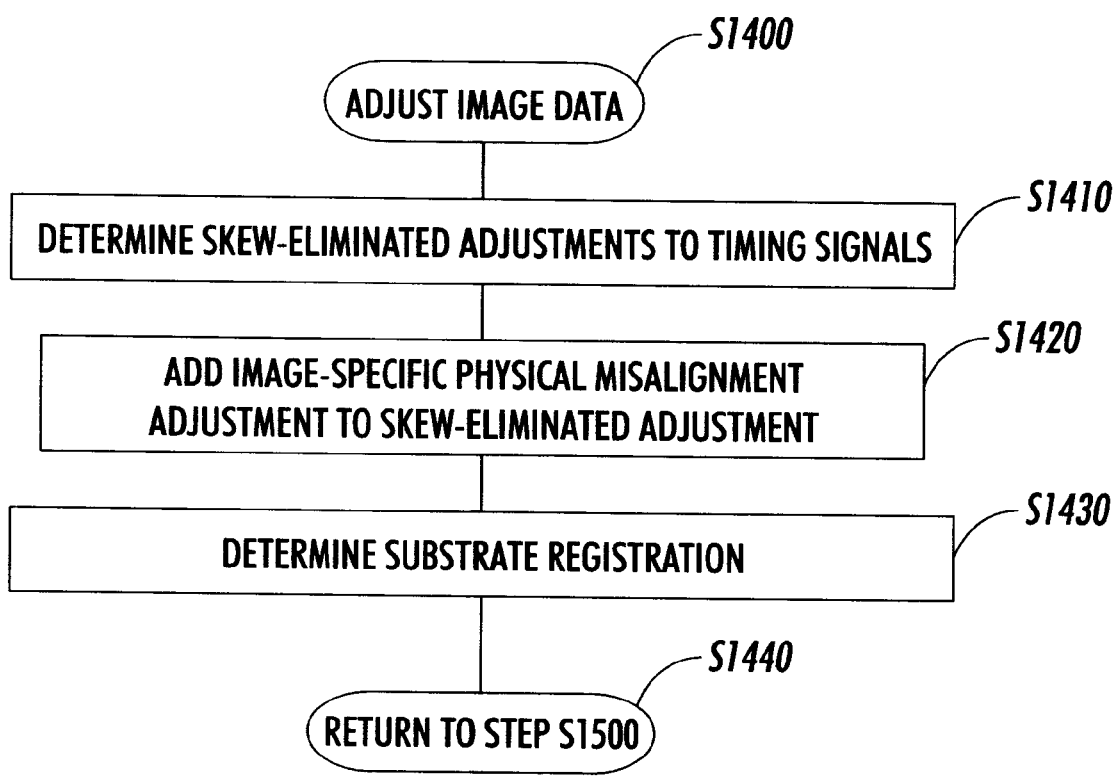
FIG. 11 is a flowchart outlining in greater detail one exemplary embodiment of the method for adjusting the image data of FIG. 10.

FIG. 11 is a flowchart outlining in greater detail one exemplary embodiment of the method for adjusting the timing signals of step S1400. Starting at step S1400, control continues to step S1410, where the skew-eliminated adjustments to the timing signals for each imager are determined based on the determined amount of skew and the gain ratio. It should be appreciated that the adjustments may be made by modifying the timing signals for the three of the imagers to place the images formed by the three imagers into registration with the image formed by the fourth imager based on the unmodified timing data used by it, as disclosed in the second and third embodiments, by modifying the timing signals for all the imagers to place the images formed by the imagers into registration with a reference position on the photoreceptor belt, as disclosed in the fourth embodiment, by modifying the timing signals for all the imagers to place the images formed by the imagers into registration with the substrate, as disclosed in the fifth embodiment, or any like process.

Next, in step S1420, for each imager, the image-specific physical misalignment adjustment determined at set-up is added to the skew-eliminating timing signal adjustment. Then, in step S1430, the transfer station timing signals that keep the resulting color layers formed by each of the imagers laterally registered with a desired position on the receiving paper substrate are determined. Next, in step S1440, control returns to step S1500.

As shown in FIG. 2, the image processing apparatus 200 is preferably implemented on a programmed general purpose computer. However, the image processing apparatus 200 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, which is capable of implementing the finite state machine that is in turn capable of implementing the flowcharts shown in FIGS. 9–11, can be used to implement the image processing apparatus 200.

This invention has been described in connection with the preferred embodiments. However it should be understood that there is no intent to limit the invention to the embodiments described above. On the contrary, the intent is to cover all alternatives, modification, and equivalents as may be included within the spirit and scope of the invention.

For example, it is to be appreciated that this invention need not only be used to determine skew in an image. For example, the invention could be used to determine the relative angle between line segments in an image. Thus, it should be appreciated that various other modifications and changes may occur to those skilled in the art without departing from the spirit and scope of this invention.

What is claimed is:

1. An image processing device, comprising:
    an image data input device that inputs image data representing an image;
    a belt;
    a plurality of image forming stations arranged along the belt;
    a first sensor provided at a first position near a steering position of the belt;
    a second sensor provided at a second position along the belt;
    a skew determining device that determines an amount of skew of the belt between the first and second sensors; and
    a skew adjustment device that controls based on the determined amount of skew formation of images by at least one of the image forming stations based on the image data.

2. The image processing device of claim 1, further comprising a transfer station arranged along the belt, wherein the second position is located near the transfer station.

3. The image processing device of claim 2, wherein a processed image is transferred by the transfer station to a receiving substrate.

4. The image processing device of claim 3, wherein the skew adjustment device controls a transfer position of the receiving substrate based on the determined skew.

5. The image processing device of claim 1, wherein the skew adjustment device includes nominal edge position information.

6. The image processing device of claim 5, wherein the first and second sensors measure edge positions of the belt.

7. The image processing device of claim 6, wherein the measured belt edge positions of each of the first and second sensors are adjusted based on the nominal edge position information.

8. The image processing device of claim 1, wherein the skew adjustment device includes nominal skew information.

9. The image processing device of claim 8, wherein the measured belt edge positions of each of the first and second sensors are adjusted based on the nominal skew information.

10. The image processing device of claim 1, wherein the skew adjustment device controls the output of the image data by the at least one of the image forming stations based on a physical imager-registration value for the image forming station, the determined amount of skew and a gain for the image forming station.

11. The image processing device of claim 1, wherein the belt is a photoreceptor belt and the image forming stations form images directly on the photoreceptor belt.

12. The image processing device of claim 1, wherein:
the skew adjustment device outputs timing control signals;
the belt is an intermediate belt; and
each image forming station includes an image carrying member on which an image is formed based on the image data and the timing control signals, the images carried by the image carrying members being transferred to the intermediate belt from the image carrying members.

13. The image processing device of claim 1, wherein:
the skew adjustment device outputs timing control signals;
the belt is a transport belt that transports an image recording member past the plurality of image forming stations; and
each image forming station includes an image carrying member on which an image is formed based on the image data and the timing control signals, the images carried by the image carrying members being transferred from the image carrying members to the image recording member.

14. An image processing method for an image processing device having a plurality of image forming stations arranged along a belt, the method comprising:
inputting image data representing an image;
sensing a first lateral position of the belt at a first position near a steering position of the belt;
sensing a second lateral position of the belt at a second position along the belt;
determining an amount of skew of the belt between the first and second positions based on the sensed first and second lateral positions of the belt; and
forming the images based on the image data and the determined amount of skew.

15. The image processing method of claim 14, wherein the second position is located near a transfer position of the belt.

16. The image processing method of claim 15, further comprising transferring the images to a receiving substrate at the transfer station.

17. The image processing method of claim 16, further comprising controlling a transfer position of the receiving substrate based on the determined skew.

18. The image processing method of claim 16, further comprising:
determining a further amount of skew between the second position and the transfer position; and
further controlling a transfer position of the receiving substrate based on the determined further amount of skew.

19. The image processing method of claim 14, further comprising determining the amount of skew based on nominal edge position information.

20. The image processing method of claim 19, wherein the sensed first and second lateral positions are adjusted based on the nominal edge position information.

21. The image processing method of claim 14, further comprising determining the amount of skew based on nominal skew information.

22. The image processing method of claim 21, wherein the sensed first and second lateral positions are adjusted based on the nominal skew information.

23. The image processing method of claim 14, wherein forming the images further comprises forming the images based on a physical imager-registration value for an image forming station, the determined amount of skew and a gain for the image forming station.

24. The image processing method of claim 23, wherein the determined amount of skew is based on a difference between a change in nominal position values between the first and second lateral positions and a change in measured position values between the first and second lateral positions.

25. The image processing method of claim 14, wherein:
the belt is a photoreceptor belt; and
forming the images comprises controlling the image forming stations to form the images directly on the photoreceptor belt.

26. The image processing method of claim 14, wherein:
the belt is an intermediate belt;
each image forming station includes an image carrying member on which an image can be formed; and
forming the images comprises:
controlling the image forming stations to form the images on the image carrying member; and
transferring the images carried by the image carrying members to the intermediate belt from the carrying members.

27. The image processing method of claim 14, wherein:
the belt is a transport belt that transports an image recording member past the plurality of image forming stations;
each image forming station includes an image carrying member on which an image can be formed; and
forming the images comprises:
controlling the image forming stations to form the images on the image carrying member; and
transferring the images carried by the image carrying members from the image carrying members to the image recording member.

28. A set up method for an image processing device having a plurality of image forming stations arranged along a belt, the method comprising:
determining an edge profile of the belt using a first sensor and a second sensor;
determining a gain difference between the first sensor and the second sensor; and
generating nominal edge profile information based on the determined edge profile and the determined gain difference.

29. The set-up method of claim 28, wherein determining the edge profile information comprises:

sensing, for each of a plurality of sample positions, an edge position at a first position along the belt using the first sensor; and sensing, for each of the plurality of sample positions, an edge position at a second position along the belt using the second sensor.

30. The set-up method of claim 28, wherein generating the nominal edge profile information comprises storing the nominal edge profile information in a nominal edge profile table.

31. A set up method for an image processing device having a plurality of image forming stations arranged along a belt, the method comprising:

determining, for each of a plurality of sample positions, a skew of the belt using a first sensor and a second sensor; and generating nominal skew information based on the determined skew at each of the plurality of sample positions.

32. The set-up method of claim 31, wherein determining the skew for each of the plurality of sample positions, comprises:

sensing, for each sample position, a first edge position at a first position along the belt using the first sensor;

sensing, for each sample position, a second edge position at a second position along the belt using the second sensor; and determining, for each sample position, a difference between the first and second edge positions as the skew for that sample position.

33. The set-up method of claim 31, wherein generating the nominal skew information comprises storing the nominal skew information in a nominal skew table.

* * * * *